US011277350B2

(12) United States Patent
Murty et al.

(10) Patent No.: US 11,277,350 B2
(45) Date of Patent: Mar. 15, 2022

(54) COMMUNICATION OF A LARGE MESSAGE USING MULTIPLE NETWORK INTERFACE CONTROLLERS

(71) Applicant: Intel Corporation, Santa Clara, CA (US)

(72) Inventors: Ravi Murty, Portland, OR (US); Keith D. Underwood, Powell, TN (US); Ravindra Babu Ganapathi, Hillsboro, OR (US); Andrew Friedley, Livermore, CA (US); Vignesh Trichy Ravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 887 days.

(21) Appl. No.: 15/865,743

(22) Filed: Jan. 9, 2018

(65) Prior Publication Data

US 2019/0044875 A1 Feb. 7, 2019

(51) Int. Cl.
*H04L 1/00* (2006.01)
*H04L 47/36* (2022.01)
*H04L 45/24* (2022.01)

(52) U.S. Cl.
CPC ............ *H04L 47/365* (2013.01); *H04L 45/24* (2013.01)

(58) Field of Classification Search
CPC ... H04L 47/365; H04L 45/24; H04L 67/1097; H04L 67/1029; G06F 9/54; G06F 9/30; G06F 9/544; G06F 9/3004; G06F 9/52; G06F 9/50
See application file for complete search history.

(56) References Cited

U.S. PATENT DOCUMENTS

| | | |
|---|---|---|
| 10,917,334 B1 | 2/2021 | Lamanna et al. |
| 2003/0112805 A1 | 6/2003 | Stanton |
| 2008/0298267 A1 | 12/2008 | Knop et al. |
| 2010/0095064 A1* | 4/2010 | Aviles ................. H04L 67/1097 711/118 |
| 2011/0153840 A1* | 6/2011 | Narayana ............ H04L 67/1029 709/227 |

(Continued)

OTHER PUBLICATIONS

"Connect-IB Single/Dual-Port InfiniBand Host Channel Adapter Cards," Mellanox Connect-IB: http://www.mellanox.com/page/products_dyn?product_family=142&mtag=connect_ib, retrieved from the internet on Jul. 25, 2018, 2 pages.

(Continued)

*Primary Examiner* — Abdelnabi O Musa
(74) *Attorney, Agent, or Firm* — Compass IP Law PC

(57) ABSTRACT

Particular embodiments described herein provide for a system for enabling the communication of a large message using multiple network interface controllers (NICs). The system can be configured to determine that a message to communicate to a receiver over a network is above a threshold, determine a plurality of NICs to be used to communicate the message, create a manifest that includes an identifier of each of the plurality of NICs, and communicate the manifest to the receiver using a multi-unit message. In an example, the multi-unit message is communicated using a PUT command and the receiver can analyze the manifest and use a GET command to pull the message from the plurality of NICs.

23 Claims, 6 Drawing Sheets

(56) References Cited

U.S. PATENT DOCUMENTS

| | | | |
|---|---|---|---|
| 2015/0067067 A1* | 3/2015 | Archer | G06F 9/544 709/206 |
| 2017/0161090 A1 | 6/2017 | Kodama | |
| 2018/0039518 A1* | 2/2018 | Jayaseelan | G06F 9/52 |
| 2019/0102236 A1* | 4/2019 | Sur | G06F 9/3004 |
| 2019/0102568 A1* | 4/2019 | Hausauer | H04L 63/0428 |

OTHER PUBLICATIONS

"Fat-Trees and Dragonflies—A Perspective on Topologies", Reinemo, Sven-Arne, HPC Advisory Councile Switzerland Workshop, Simula Research, 20 pages.

"Introducing Aurora," Argonne Leadership Computing Facility, ALCF Staff, Apr. 9, 2015, retrieved from the internet on Jul. 25, 2018, https://www.alcf.anl.gov/articles/introducing-aurora, 3 pages.

"MVAPICH-Aptus: Scalable High-Performance Multi-Transport MPI over InfiniBand", Koop et al Network-Based Computing Lab, The Ohio State University, Lawrence Livermore National Lab, 34 pages.

"Scalable high performance message passing over Infiniband for Open MPI", Friedley et al., Open Systems Laboratory, Sandia National Laboratories, Lawrence Livermore National Laboratory, 8 pages.

"Stampede Cutting-Edge HPC, Visualization, Data Analysis, and Data-lntensive Computing", Texas Advanced Computing Center, retrieved from the internet on Jul. 25, 2018, https://www.taxx.utexas.edu/systems/stampede, 2 pages.

"The Portals 4.0.2 Network Programming Interface", Barrett et al., Sandia Report, Sandia National Laboratories, Oct. 2014, 154 pages.

Barrett, et al, "A Low Impact Flow Control Implementation for Offload Communication Interfaces," EuroMPI 2012; LNCS 7490, pp. 27-36, Springer-Verlag Berlin Heidelberg 2012.

Kim et al., "Technology-Driving, High-Scalable Dragonfly Topology", IEE Computer Society, 2008, pp. 77-88.

Koop et al., "Designing High-Performance and Resilient Message Passign on InfiniBand", IEEE 2010, 7 pages.

Raikar, et al., "Designing Network Failover and Recovery in MPI for Multi-Rail InfiniBand Clusters," 2012 IEE 26th International Parallel and Distributed Processing Symposium Workshops & PhD Forum, pp. 1160-1167.

Reference Implementation of Portals over Infiniband, retrieved from internet on Jul. 25, 2018, https://github.com/Portals4/portals4/tree/master/src/ib.

Liu, Jiuxing, Abhinav Vishnu, and Dhabaleswar K. Panda. "Building multirail infiniband clusters: Mpi-level design and performance evaluation," In Supercomputing, 2004. Proceedings of the ACM/IEEE SC2004 Conference, IEEE, 2004, 13 pages; https://pdfs.semanticscholar.org/e124/60cf8ae6150c118c54fb4434349afff45638.pdf.

Liu, Jiuxing, Amith Mamidala, Abhinav Vishnu, and Dhabaleswar K. Panda. "Evaluating infiniband performance with pci express." IEEE Micro 25, No. 1 (2005): 20-29, 10 pages; http://citeseerx.ist.psu.edu/viewdoc/download?doi=10.1.1.229.561&rep=rep1&type=pdf.

Understanding MPI Tag Matching and Rendezvous Offloads (ConnectX-5), created by ophirmaor on Aug. 3, 2016 2:05 PM; last modified by ophirmaor on Feb. 17, 2017 2:13 PM [retrieved and printed from the Internet on Mar. 21, 2018], © 2018 Mellanox Technologies, 4 pages; https://community.mellanox.com/docs/DOC-2583.

* cited by examiner

COMMUNICATION OF A LARGE MESSAGE USING MULTIPLE NETWORK INTERFACE CONTROLLERS

TECHNICAL FIELD

This disclosure relates in general to the field of computing and/or networking, and more particularly, to the communication of a large message using multiple network interface controllers.

BACKGROUND

Emerging network trends in both data center and telecommunication networks place increasing performance demands on a system. Application performance depends on good use of the network and efficient use of the data traffic on the network. A network interface controller (NIC), also known as a network interface card, network adapter, LAN adapter, physical network interface, and other similar terms, is a computer hardware component that connects a computer to a network and provides applications with a dedicated, full-time connection to the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system for enabling the communication of a large message using multiple network interface controllers (NICs). The term "large message" refers to a message larger than a network maximum transmission unit (MTU). The MTU is the size of the largest network layer protocol data unit that can be communicated in a single network transaction. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
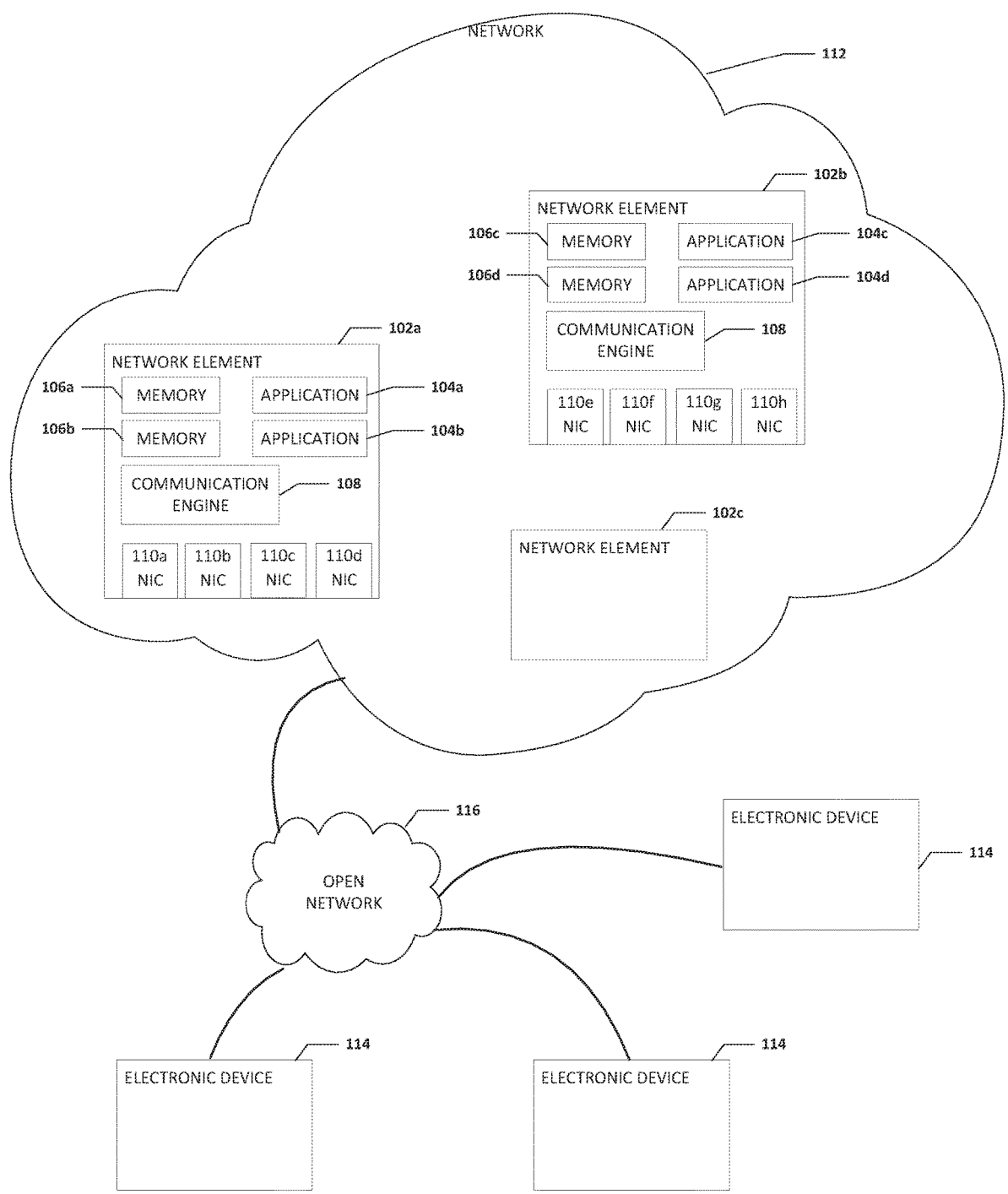
FIG. 1 is a simplified block diagram of a system to enable the communication of a large message using multiple network interface controllers (NICs), in accordance with an embodiment of the present disclosure.

FIG. 1 is a simplified block diagram of a system 100 to enable the communication of a large message using multiple NICs, in accordance with an embodiment of the present disclosure. System 100 can include one or more network elements 102a-102c. Network element 102a can include one or more applications 104a and 104b, one or more regions of memory 106a and 106b, a communication engine 108, and a plurality of NICs 110a-110d. Network element 102b can include one or more applications 104c and 104d, one or more regions of memory 106c and 106d, a communication engine 108, and a plurality of NICs 110e-110h. Each application 104a-104d may be a virtual network function (VNF). Each NIC 110a-110h may be a high-speed NIC such as a high-speed host fabric interface (HFI). Each region of memory 106a-106d can be a region of memory where data to be communicated is located. Further, each region of memory 106a-106d can be a portion of system memory and may be a buffer. Network elements 102a-102c may be in communication with each other using network 112. Network 112 may be part of a data center. In an example, one or more electronic devices 114 and open network 116 may be in communication with network 112.

It is to be understood that other embodiments may be utilized and structural changes may be made without departing from the scope of the present disclosure. For example, each network element may have one or more applications, one or more regions of memory, and/or one or more NICs. Substantial flexibility is provided by system 100 in that any suitable arrangements and configuration may be provided without departing from the teachings of the present disclosure.

Message passing interface (MPI) has become the de-facto programming model used in high performance computing (HPC). MPI provides both point-to-point as well as collective communications capabilities. The software stack for some NICs can provide a low-level communication application program interface (API) called the open fabric interface (OFI) that takes advantage of the off-load capabilities of hardware to implement efficient point-to-point and collective communications. System 100 can be configured to communicate a large message across multiple NICs and still maintain message/tag match ordering and not violate the MPI tag matching rule. The MPI tag matching rule is commonly understood as an ordering guarantee of certain properties of point-to-point semantics. The MPI tag matching rule is a non-overtaking rule that includes a requirement that facilitates the matching of sends to receives and guarantees that message-passing is deterministic. In cases where a single NIC and a single remote NIC are used to send and receive messages, tag matching for small and large messages can be easily maintained because all messages are sent in order, initiated from a single NIC, and are destined to a single remote NIC.

When sending large messages, a GET command may be used. The GET command is part of the current MPI protocol. In a GET operation (e.g., an operation that uses the GET command), a receiver communicates a message to an initiator (in this example the initiator is commonly referred to as a target since it is the "target" of the GET command) requesting data from the initiator. The receiver can use the GET command to pull the data from the initiator's memory region that includes the data. One of the parameters of a GET command is an offset from which to start pulling data. For example, to pull a message with length "N" bytes, a first GET command can be issued with an offset of 0 and length N/2 and a second GET command can be issued with an offset of N/2 and a length of N/2. The offset is included in the header portion of the message that is part of the GET command. Another parameter included in the header portion of the message is the message identifier (ID). Also, in a PUT command from the initiator to the receiver, the message ID will be included in the header. The message ID is a unique value that distinguishes one message from all others.

Tag match bits are also part of the current MPI protocol. Rather than simply streaming data like TCP, MPI defines messages as a finite payload plus an envelope (which contains tag match bits). At the receiver, incoming messages are only delivered to memory regions that are associated with tag match bits found in the message's envelope. Messages communicated from one device to another device include tag match bits that the receiver can use to identify messages and determine where the message needs to be stored. In the current MPI protocol, multiple messages can have the same tag match bit value. If there are multiple messages from a single initiator and multiple receives at the receiver with the same tag match bits, the messages are matched in the order they are sent, per the MPI tag matching rule, even if the messages arrive out of order (e.g., due to different network paths). When the messages arrive and are matched out of order, errors can occur.

In an example, system 100 can be configured to send a relatively small message from an initiator (e.g., network element 102a) on a chosen primary NIC that provides a receiver (e.g., network element 102b) with a list of initiator NICs (e.g. NICs 110a-110d) as well as transport protocol specific information. The primary NIC is a NIC that is used for all messages (independent of size) for a pair of MPI processes (e.g., an MPI process between network elements 102a and 102b that is related to application 104a). The receiver can then use the list of initiator NICs as targets to communicate a plurality of GET commands and pull a large message from the initiator's memory (e.g., memory 106a) when the receiver is ready to pull the large message. System 100 can be configured such that a GET command from the receiver to the initiator includes a message ID as the tag match bits. The message ID identifies the exposed region of memory on the initiator where the data for the large message is located. The receiver can communicate the message ID to the initiator so the initiator knows what data and region of memory is associated with the GET command. In addition, the receiver can choose a set of NICs (e.g., NICs 110e-110h) on its node to initiate the GET commands.

In order to distinguish between an application initiated small message from the small message that includes the list of initiator NICs, the message that includes the list of initiator NICs utilizes an existing header data field but encodes the header data field with information that will allow the receiver to recognize that the initiator was trying to send a large message using multiple NICs. The envelope portion of the small message that includes the list of initiator NICs can include a message ID (to be used as tag match bits) for the message. The message ID can be used by the receiver to identify the exposed region of memory on the initiator where the data for the message is located. The initiator's response to the GET command will also include the message ID and the receiver can use the message ID to determine where to store each chunk of the large message as it arrives at the receiver in the receiver's exposed regions of memory and reconstruct the chunks of the large message.

The list of initiator NICs can be included in the payload portion of the message as a manifest. Once the initial small message that includes the manifest is delivered to the receiver from the initiator, the receiver can analyze the manifest and create a strategy to pull the full large message across the network using multiple GET commands. For example, the receiver can initiate a pull of the entire large message using one or more commands that will cause the communication of the large message to benefit from topologies that support other efficiencies such as adaptive routing. This allows the chunks of the large message to be delivered in any order and the manifest provides the receiver with enough information to pull the entire large message once the tag matching is successfully completed. The MPI tag matching rule is not violated because the initial small message includes the message ID (to be used as tag matching bits) necessary to ensure the chunks are sent to the correct memory region in the receiver and allow the chunks to be reconstructed into the original large message.

Elements of FIG. 1 may be coupled to one another through one or more interfaces employing any suitable connections (wired or wireless), which provide viable pathways for network (e.g., network 112, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Contemporary networking devices such as NICs can undergo significant strain to communicate large messages across a network. A key requirement of a valid implementation of MPI is that it must guarantee certain properties of point-to-point semantics which include a MPI tag matching rule, sometimes referred to as an ordering guarantee or non-overtaking rule. The MPI tag matching rule helps to facilitate the matching of sends to receives and guarantees that the message-passing code is deterministic. A single NIC can be used to send a mix of small and large messages. Some remote direct memory access (RDMA) capable devices provide hardware offloads of the transport protocol that allows a sender to transfer a message directly into receiver allocated memory without any CPU (e.g., memory copies) and kernel involvement (e.g., bypass). In most current systems, large messages are communicated using a ready-to-send (RTS)/clear-to-send (CTS) exchange. In an example, large message sends are offloaded to hardware that implements a rendezvous protocol where the sender commonly referred to as an initiator, issues a RTS control message that contains some matching information, commonly referred to as tag match bits. The receiver, commonly referred to as target or destination, responds with a CTS only after the receiver is able to receive the message and has a matched receiver posted region of memory. The MPI tag matching rule is still maintained because all messages are ordered tag matches and are communicated in order in a pipeline.

Transfer of large messages using multiple NICs results in higher aggregate bandwidth for applications and makes the system more resilient to failures. Depending on the application, in some cases this translates to a reduction in communication time and overall improvement of application performance. Additionally, customers who choose to pay for multiple NICs per node have come to expect bandwidth proportional to the number of NICs on the node. A straightforward implementation involves splitting a large message into multiple chunks and then using multiple NICs to send each chunk. However, such an implementation involving multiple chunks sent across multiple NICs can violate the MPI tag matching rule because each of these chunks can arrive out-of-order with respect to other messages.

Currently, there are several MPI implementations that use techniques like striping or binding to improve bandwidth over multiple Infiniband (IB) host channel adapters (HCAs) that offload the IB transport protocol to hardware. While binding is a coarse-grained implementation much like a distributed scheme, in striping mode, a message is broken up into multiple chunks which are sent using multiple host channel adapters (HCAs). However, even with a hardware offload of the transport protocol, tag matching is left up to software with no additional acceleration provided in the hardware.

Some current solutions implemented in generation two (gen2) HFIs utilize a single pair of HFIs to send messages between nodes independent of the actual processes, MPI ranks, and the number of HFIs available on each node. The term "MPI rank" includes an MPI unique identifier fora specific MPI session, instance, process, etc. For example, each of ten MPI sessions, instances, processes, etc. may be identified by a unique number from zero to nine (e.g., the first MPI session, instance, process, etc. has a rank of zero, the second MPI session, instance, process, etc. has a rank of one, etc.). In some implementations, multiple HFIs can be utilized to send messages and improve aggregate bandwidth using several coarse-grained schemes such as a distributed scheme or a hashed scheme. In a distributed scheme, an MPI endpoint uses a single HFI for all its communications to multiple MPIs ranks. However, multiple MPI ranks on a local node may be spread across (e.g. round robin) available HFIs. Also, sending a large message from a single MPI rank does not take advantage of all the available local HFIs. In a hashed scheme, a single MPI rank typically communicates with multiple remote MPI ranks and all communications between two MPI ranks occur on a specific local/remote HFI pair. However, the local HFI may be different when the same local MPI rank is communicating with a different remote MPI rank. For example, a hashing function might use the source and destination rank numbers to compute a local HFI index. This guarantees ordering for all communications between the two MPI rule ranks, meeting the MPI tag matching rule. However, large messages sent between a pair of MPI ranks are still limited to a single HFI.

A straight forward extension of the existing large message transfer scheme where a large message is split into multiple chunks and sent using multiple source HFIs might seem like a sufficient solution, but it does not guarantee the MPI point-to-point ordering semantic and may violate the MPI tag matching rule. For example, an MPI at a receiver posts two receives in succession with the same tag match bits. The first region of memory (b1) is of size 128 bytes and the second region of memory (b2) is of size 1 GB. An MPI running on the initiator posts two sends in succession. The MPI tag matching rule states that b1 must tag match and land in b1 on the receiver. Similarly, b2 must match b2 and land in b2 on the receiver. The initiator sends a PUT command to send b1 to the target with the appropriate tag match bits on HFI 0. The initiator then uses the RTS/CTS mechanism to initiate the transfer of b2. The RTS for b2 is associated with a different HFI 1 following the PUT command of b1 on HFI 0. In this case, b2 takes a different path through the network at arrives at the receiver before b1. The tag matching logic on the receiver matches b2 to the posted receive region of memory b1, violating the MPI tag matching rule because there is no ordering between HFIs (HFI 0 and HFI 1 on the initiator) even when they are communicating with the same destination HFI (HFI 0 on the receiver). The same problem also exists for sending multiple chunks of b2 over different HFIs as latter chunks may arrive prior to the first chunk (e.g., take a different route through the network). This is because each HFI pair maintains an independent connection state via a set of packet sequence numbers. What is needed is a solution that can communicate a large message across multiple HFIs and still maintain message/tag match ordering.

A system for the communication of a large message using multiple NICs, as outlined in FIG. 1, can resolve these issues (and others). MPI is the de-facto communication model for high-performance computing and provides the ability to send and receive messages between processes and nodes. In MPI, a message consists of a data payload plus an envelope containing metadata. The envelope of each message can include a source, a tag, and a communicator.

The source, tag, and communicator are used to match a send operation to a particular receive operation. Receive operations are posted to a pending receive queue where they await incoming messages. As each message arrives, its envelope is compared to each of the queued receives and the message is delivered (copied) into the memory area allocated by the first matching receive.

When presented with a message to send, the initiator first decides if it must employ a multi-unit message scheme (herein referred to as "MU"). If the message is smaller than the MTU, the message can be sent using a standard PUT command because the entire message fits in a single packet and can be delivered to the receiver with a single message. In a current standard PUT command (e.g., MPI PUT command), the header portion of the PUT command includes a message ID. The MTU is the size of the largest network layer protocol data unit that can be communicated in a single network transaction. Fixed MTU parameters usually appear in association with a communications interface or standard. If the message is above a threshold, the send is initiated by sending a relatively small amount of data (e.g., less than or equal to 64 bytes) in the payload portion of the message that describes a list of NICs that the initiator plans to use for the communication of the large message. The threshold can include messages that are above the MTU. In an example, an administrator may set the threshold as a message size that is larger the MTU based on system performance, bandwidth, overall cost, or other considerations. In some systems, if the message is larger than the network MTU, the message may be sent using a single NIC or across multiple NICs as messages that are slightly larger than the MTU may not benefit from MU.

The relatively small amount of data in the payload portion is called the manifest. The manifest can include a list of NICs on the initiator that the receiver can use to obtain the large message. The list of NICs may include all NICs on the initiator that can be employed to reach the destination on the receiver. In some cases, only a subset of the NICs available on the initiator might be part of this list. Note that the initiator might choose to prune the list of all the NICs that are available to reduce the overhead associated with exposing regions of memory to multiple NICs, reserve NICs for other traffic, and/or only provide NICs that are accessible from the receiver. The initiator can expose the allocated region of memory that includes the data for the large message to each NIC in the manifest that the initiator plans to use for communicating the large message. The receiver is free to choose from any of these NICs to pull any part or chunk of the large message.

In an illustrative example, the initiator can determine a plurality of local NICs that are able to communicate the large message and the address of each NIC. The initiator exposes the memory region that includes the data for the large message to the plurality of NICs, builds the manifest containing the addresses of all the plurality of NICs that will be used to communicate the large message to the receiver, inserts a message ID in an envelope portion of an MU message, and communicates the MU message that includes the manifest and message ID to the receiver instead of the large message. The header portion of the MU message includes a toggle flag or bit that indicates the initiator intends to use MU. The term "header data" includes header information (e.g., a source identifier, a destination identifier, type, etc.). If the MU bit is set, then the receiver knows that the message data is not application data but includes the manifest (the list of addressing information for the initiator's NICs). The receiver knows what NICs it has and, based on the manifest, the receiver knows what NICs the initiator has available for the receiver to request the large message using GET commands. The receiver can use GET commands to pull the large message from the memory region exposed to each NIC. For example, to pull a message with length "N" bytes in two chunks, one NIC will issue a GET command with an offset of 0 and length N/2 and the other NIC will issue a GET command with an offset of N/2 and also a length of N/2. The GET command to the initiator can also include a unique message ID in the envelope portion of the GET command. The message ID is a unique tag match value that the initiator associates with the memory region (that includes the data for the large message) that has been exposed to each NIC listed in the manifest. To generate the message ID, a simple counter can be read and incremented for each message or it can be derived from a hardware resource uniquely associated with the send operation (e.g., the NICs match entry handle for the exposed memory region). A key requirement is that the message ID is a unique value that distinguishes the large message from all other messages. When the receiver issues GET commands to pull message data, it uses the message ID (in the envelope portion of the MU message sent by the initiator) as the tag match bits to ensure the correct data is requested and received.

System 100 can be configured to utilize a fine-grained scheme where a single pair of MPI ranks can use multiple NICs (both on the source and destination) to transfer a single large message to a destination MPI rank. This can enable a software protocol on top of an RDMA capable device that offloads not only a transport protocol but can also handle tag matching and not violate the tag matching rule. In system 100, all messages, small and large are initiated from a primary NIC. This might seem limiting at first but the limitation may be eliminated, or mitigated, by observing that the MPI tag matching rule only applies to a pair of MPI endpoints. This means that the primary NIC used for tag matching may be different for different pairs of MPI processes (e.g., the MPI rank ID may be used as a hashing function to compute which of the local NICs should be used to send the initial message that includes the manifest and message ID).

In an example, when a receiver receives a message, the receiver examines the header data to see whether the message is an MU message and MU is in use. If the message sent by the initiator was not an MU message (e.g. the message was small or below the threshold) then the receiver accepts the message as a standard PUT command because the entire message fits in a single message packet and is delivered to the receiver. If the message is large (e.g., the message is larger than an MTU) but MU is not enabled, then the message may be broken up into chunks and each chunk can be sent using a RTS/CTS mechanism to transfer each chunk. This could also happen if the initiator is a legacy initiator that does not support MU. If the MU fields in the header data indicate that the initiator chose not to use MU, an expected receive operation is performed. If the header data is present and the MU indicator is set, indicating that the payload in the message includes the manifest, the receiver then tries to interpret the manifest to build a list of NICs to use to pull the large message from the initiator.

In a specific implementation, the existing software stack for a generation two (gen2) HFI must handle expected receives vs. unexpected receives correctly. The term "expected receive" includes where the initiator sent a message and the receiver already had a receive ready for the message and accepts it, (e.g., the data goes straight into a designated region of memory). The term "unexpected receive" includes where the initiator sent a message and the receiver was not ready for the message. Because the receiver was not ready for the message, the message goes into an unexpected list. In an unexpected example, the initiator sends the message without knowing if the receiver has already posted a receiver region of memory for the message (expected) or has not posted a receiver region of memory for the message (unexpected). The initiator may send a message of any size to the receiver. Small messages (less than the MTU) are sent using a standard PUT command while large messages (greater than or equal to the MTU) are sent using a RTS/CTS rendezvous scheme. The initiator and the receiver must ensure that mismatches between the initiator and receiver are handled properly which may result in truncation in some cases (e.g. the initiator side region of memory is greater than the receiver side posted region of memory).

System 100 can be configured to extend the existing unexpected message handling scheme to stripe a large message across multiple NICs (e.g., to break a message into chunks and send each chunk over a different path through the network using multiple NICs to the same final destination) and help to ensure that the MPI tag matching rule is still maintained while allowing the initiator and the receiver freedom in how they choose to stripe the message. The initiator can be configured to compute a count of NICs on itself that have connectivity to the receiver. The initiator can post a match entry (ME) on each NIC. Each ME will point to the entire initiator side region of memory that includes the data to be communicated to the receiver and each ME is associated with a message ID that was communicated to the receiver. When a GET command is received, the GET command will include a message ID that corresponds to an ME. The corresponding ME can be used to identify the region of memory that includes the data to be used when responding to the GET command.

In an example, the manifest is deposited directly in the matching receiver's allocated region of memory. However, the receiver's allocated region of memory may be smaller than the manifest itself (e.g. a receive can be zero bytes). If the receiver's allocated region of memory is smaller than the manifest, that can mean that the message to be transferred is relatively small and the receiver can use a single GET command on the primary NIC to pull the message that includes the manifest. The receiver's allocated region of memory may be large enough to hold the manifest, but not large enough for the initiator's entire message. Just as in the case where the receiver's allocated region of memory is large enough for the entire message, the receiver, at its discretion, may use any of the available NICs to retrieve the message using GET commands (one per sender/receiver NIC pair) from the initiator. Fewer, or even one NIC may be used if the message is small enough that the overhead of using multiple NICs outweighs the benefit of splitting the message across each NIC.

The initiator can expose its region of memory in any way it chooses. This information is conveyed via the manifest to the receiver and will allow the initiator to expose the region of memory to fewer NICs if it is running out of resources. This also means that legacy initiators that do not support MU can interoperate with receivers that support MU. The receiver can choose to use any number of NICs to pull the data from the initiator and choose to use only a subset of the initiator's NICs provided in the manifest. This might be fewer than the number of NICs exposed by the initiator in the manifest, but cannot be more than the number of NICs in the manifest. This implies that some of the NICs on the initiator side will never see GET commands and associated events but will need to be cleaned up to avoid resource leaks. In a specific clean up example, the receiver will issue a GET/rendezvous (RNDV) GET request and piggy back the NIC count set to the number of NICs on the initiator that the receiver sends requests, independent of the actual NICs the receiver uses. The cleanup is used when the receiver did not use all the NICs in the manifest to pull the data.

The initiator always exposes the message's data to every NIC in the manifest and needs to remove the exposures after the receiver has pulled the data from the initiator. To remove the exposure, the receiver can set a special tag or code (e.g., HDR_DATA.MU=2 in MU data portion 132 illustrated in FIG. 3A) and communicate to the initiator the number of NICs on the initiator that the receiver will use to pull the data from the initiator. The initiator can compare the communicated number of NICs on the initiator that the receiver will use to pull the data from the initiator to the number of GET commands that the initiator received. When the number of GET commands that the initiator received matches the communicated number of NICs on the initiator that the receiver will use to pull the data from the initiator, the send can be completed and the exposures can be removed.

Turning to the infrastructure of FIG. 1, system 100 in accordance with an example embodiment is shown. Generally, system 100 may be implemented in any type or topology of networks. Network 112 represents a series of points or nodes of interconnected communication paths for receiving and transmitting packets of information that propagate through system 100. Network 112 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as MPI, Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, MPI, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102c, are meant to encompass network elements, network appliances, servers, routers, switches, gateways, bridges, load balancers, processors, modules, or any other suitable device, component, element, or object operable to exchange information in a network environment. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102c may be virtual or include virtual elements.

In regard to the internal structure associated with system 100, each of network elements 102a-102c can include memory elements for storing information to be used in the operations outlined herein. Each of network elements 102a-102c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of system 100, such as network elements 102a-102c may include software modules (e.g., communication engine 108) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
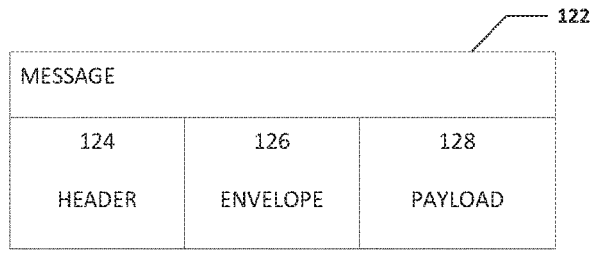
FIG. 2 is a simplified block diagram of a portion of a system to enable the communication of a large message using multiple NICs, in accordance with an embodiment of the present disclosure.

Turning to FIG. 2, FIG. 2 is a simplified block diagram of an example of a message 122 for use in system 100. Message 122 can be used in communications between network elements (e.g., between network element 102a and 102b). For example, message 122 can be used for a PUT command, a GET command, when communicating a message that includes an amount of data that is less than an MTU, when communicating a message that includes an amount of data that is more than an MTU threshold, etc. Message 122 can include a header portion 124, an envelope portion 126, and a payload portion 128. Header portion 124 can include addressing and other data that is required for message 122 to reach its intended destination. Header portion 124 can also include offset data and MU data as described in FIG. 3A. In an example, envelope portion 126 is part of header portion 124.

Envelope portion 126 can include data to help distinguish various messages and allow a network element to selectively receive message 122. Envelope portion 126 is typically implementation dependent and can include a message tag, communicator, source, destination, message length, tag match bits, message ID, and other implementation specific information. In an example, envelope portion 126 may include communicator data. The communicator data can include a handle to a group or ordered set of processes and can specify a communication context. Payload portion 128 can include the payload data of message 122. In an example, payload portion 128 can include a manifest as described in FIG. 3C.

Figure 3A:
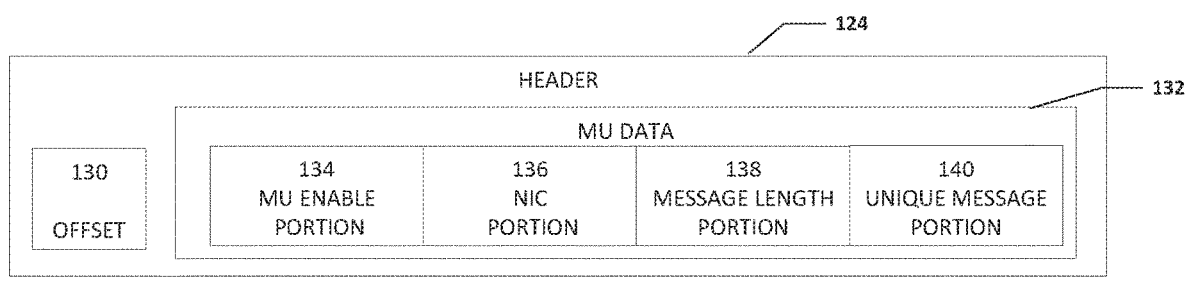
FIGS. 3A-3D are simplified block diagrams of a portion of a system to enable the communication of a large message using multiple NICs, in accordance with an embodiment of the present disclosure.

Turning to FIG. 3A, FIG. 3A is a simplified block diagram illustrating example details of header portion 124 for use in system 100, in accordance with an embodiment of the present disclosure. Header portion 124 can include an offset portion 130 and an MU data portion 132. MU data portion 132 can include an MU enabled portion 134, a NIC portion 136, a message length portion 138, and a unique message portion 140. Offset portion 130 includes the offset in the allocated memory region from which to start pulling data for the response to a GET command. In an example, MU data portion 132 may be a 64-bit field.

MU enabled portion 134 may be related to a MU parameter. For example, a value of zero in MU enable portion 134 can indicate that the MU protocol is disabled or not chosen. A value of one in MU enable portion 134 can indicate that, in the initiator to receiver direction, the MU is enabled. A value of two in MU enable portion 134 can indicate that, in the receiver to initiator direction, the MU is enabled and may indicate a cleanup. A value of three in MU enable portion 134 can be reserved. In a specific example, MU enable portion 134 may be a two-bit integer.

NIC portion 136 can indicate NIC related data. For example, a zero value in NIC portion 136 can be undefined. A one value in NIC portion 136 can be initiator specific and specify how many NICs an indicator has available for the receiver to pull the chunks of the message. A two value in NIC portion 136 can be receiver specific and specify how many of the initiator side NICs the receiver will use to pull the chunks of the message. This can also be used to provide the indicator with a count of how many GET commands to expect from the receiver before cleaning up allocated regions of memory. A three value in NIC portion 136 can be reserved. In a specific example, NIC portion 136 may be a three-bit integer.

Message length portion 138 can indicate the size of the message length. For example, a zero value in message length portion 138 can be undefined. A one value in the message length portion 138 can indicate the length of the initiator's allocated regions of memory. A two value in message length portion 138 can indicate the possible length of the pull request across the NICs. A three value in message length portion 138 can be reserved. In a specific example, message length portion 138 may be a thirty-two bit integer.

In a PUT command, unique message portion 140 can indicate the tag matching or message ID for the communication related to message 122. (In a responding GET command from the receiver, the message ID is used as the tag matching bits and is included in the envelope portion of the message. In an example, a zero value in unique message portion 140 can be undefined. A one value in unique message portion 140 can indicate that the initiator generated unique message ID for a given multi-unit transaction. A two value in unique message portion 140 can be used by the receiver to echo the message ID field from the initiator. A three value in the unique message portion 140 can be reserved. In a specific example, unique message portion 140 may be a twenty-eight bit integer.

Figure 3B:
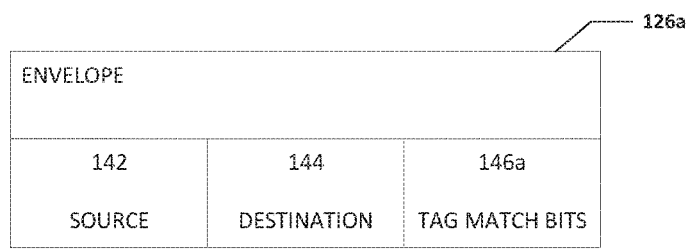

Turning to FIG. 3B, FIG. 3B is a simplified block diagram illustrating example details of envelope portion 126a for use in system 100, in accordance with an embodiment of the present disclosure. Envelope portion 126a can include a source portion 142, a destination portion 144, and a tag match bits portion 146a. Source portion 142 can help identify the source of message 122 and is implicitly determined by the identity of the source of message 122. The source of message 122 may be an initiator or a receiver (e.g., an initiator that is the source of a PUT command message or a receiver that is the source of a GET command message). Destination portion 144 can help identify the destination of message 122 and is specified by a dent argument in MPI. The destination may be an initiator or a receiver. Tag match bits portion 146 can help provide a mechanism for distinguishing between different messages. In MPI, a sending process must associate a tag with a message to help identify the message.

Figure 3C:
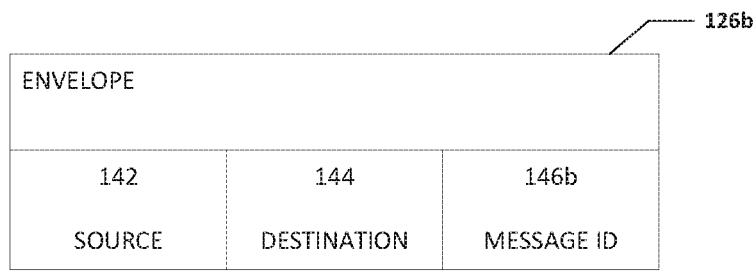

Turning to FIG. 3C, FIG. 3C is a simplified block diagram illustrating example details of envelope portion 126b for use in system 100, in accordance with an embodiment of the present disclosure. In an initial PUT command from the initiator, the tag matching bits are provided by the initiator (e.g., communication engine 108), and are matched against the tag match bits of receives at the receiver. When either rendezvous or MU are in use, the tag matching bits in the GET command(s) are set to the message ID. The receiver obtains the message ID from the header data of the original PUT from the initiator. Envelope portion 126b can include source portion 142, destination portion 144, and a message ID portion 146b. Message ID portion 146b can include the message ID that will allow the initiator to identify the exposed region of memory on the initiator where the data for the message is located. In addition, the receiver can use the message ID (and the NIC where data was received) to determine the allocated memory region on the receiver that a chunk of data should be placed.

Figure 3D:
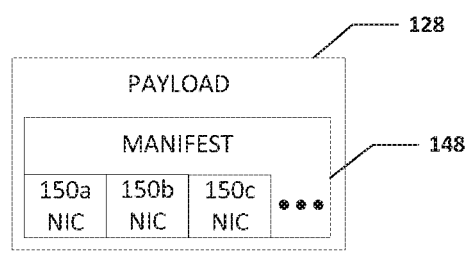

Turning to FIG. 3D, FIG. 3D is a simplified block diagram illustrating example details of payload portion 128 for use in system 100, in accordance with an embodiment of the present disclosure. Payload portion 128 can include a manifest 148. Manifest 148 can include NIC data 150a-150c.

NIC data 150a-150c can include an identification of each specific NIC on the initiator that a receiver can use to pull data from the initiator.

Figure 4:
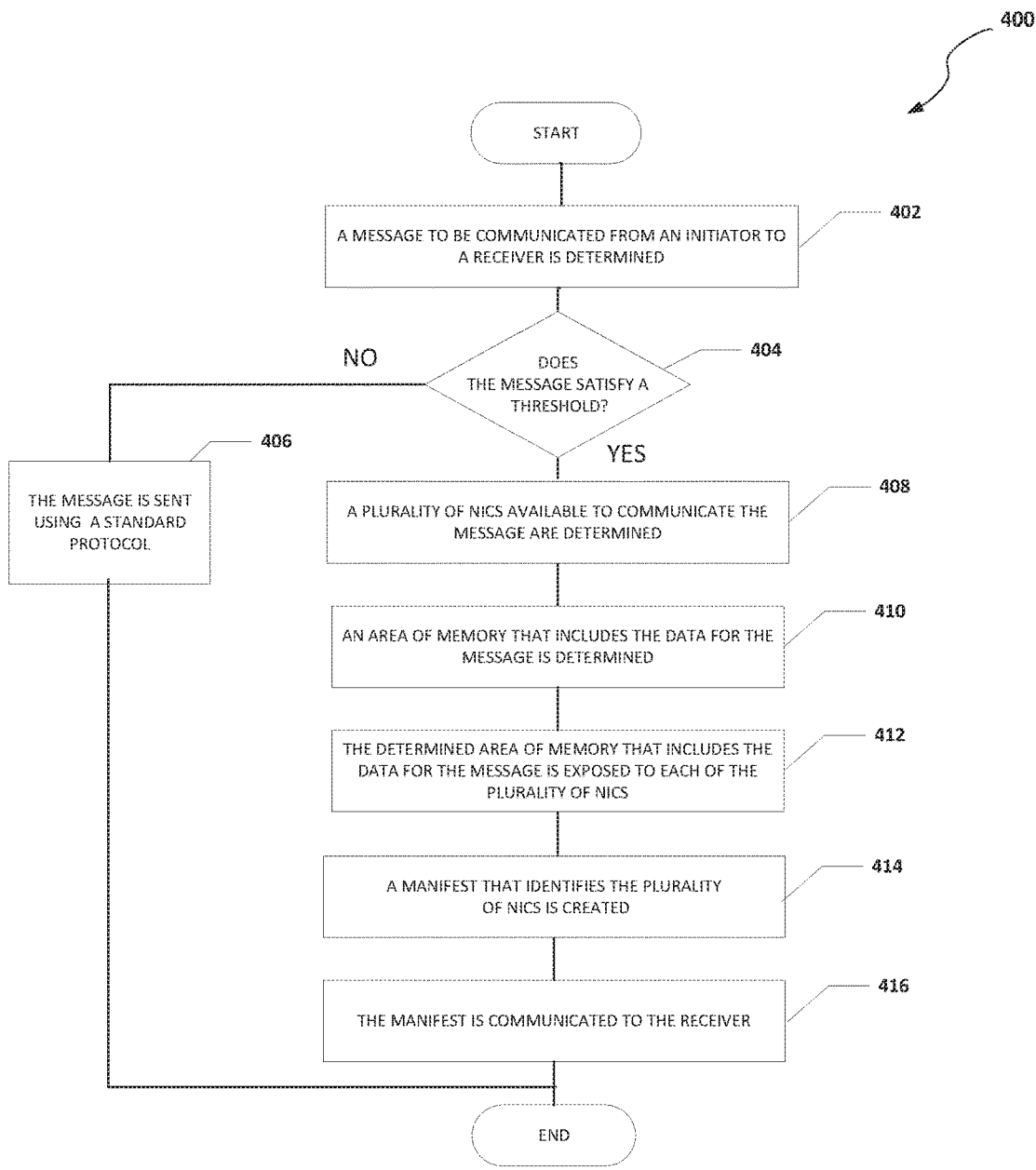
FIG. 4 is a simplified flowchart illustrating potential operations that may be associated with the system in accordance with an embodiment.

Turning to FIG. 4, FIG. 4 is an example flowchart illustrating possible operations of a flow 400 that may be associated with the communication of a large message using multiple NICs, in accordance with an embodiment. In an embodiment, one or more operations of flow 400 may be performed by communication engine 108. At 402, a message to be communicated from an initiator to a receiver is determined. At 404, the system determines if the message satisfies a threshold. For example, the threshold may be an MTU. If the message does not satisfy the threshold, then the message is sent using a standard protocol, as in 406. For example, if the message is small, the message can be sent using an MPI PUT command because the entire message fits in a single packet and is delivered to the receiver. If the message is large (e.g. larger than an MTU and MU is not enabled), then the message may be sent using a RTS/CTS mechanism.

If the message does satisfy the threshold, then a plurality of NICs available to communicate the message are determined, as in 408. At 410, an area of memory that includes the data for the message is determined. At 412, the determined area of memory that includes the data for the message is exposed to each of the plurality of NICs. At 414, a manifest that identifies the plurality of NICs is created. At 416, the manifest is communicated to the receiver. In an example, a ME is posted on each of the determined plurality of NICs, where the ME points to the exposed area of memory that includes the data for the message. The ME is associated with a message ID and the message ID can be sent to the receiver in a PUT command. When an initiator receives a GET command at a NIC from a receiver, the GET command will include the message ID and the message ID can be used to determine the ME and the exposed area of memory that includes the data to be communicated to the receiver.

Figure 5:
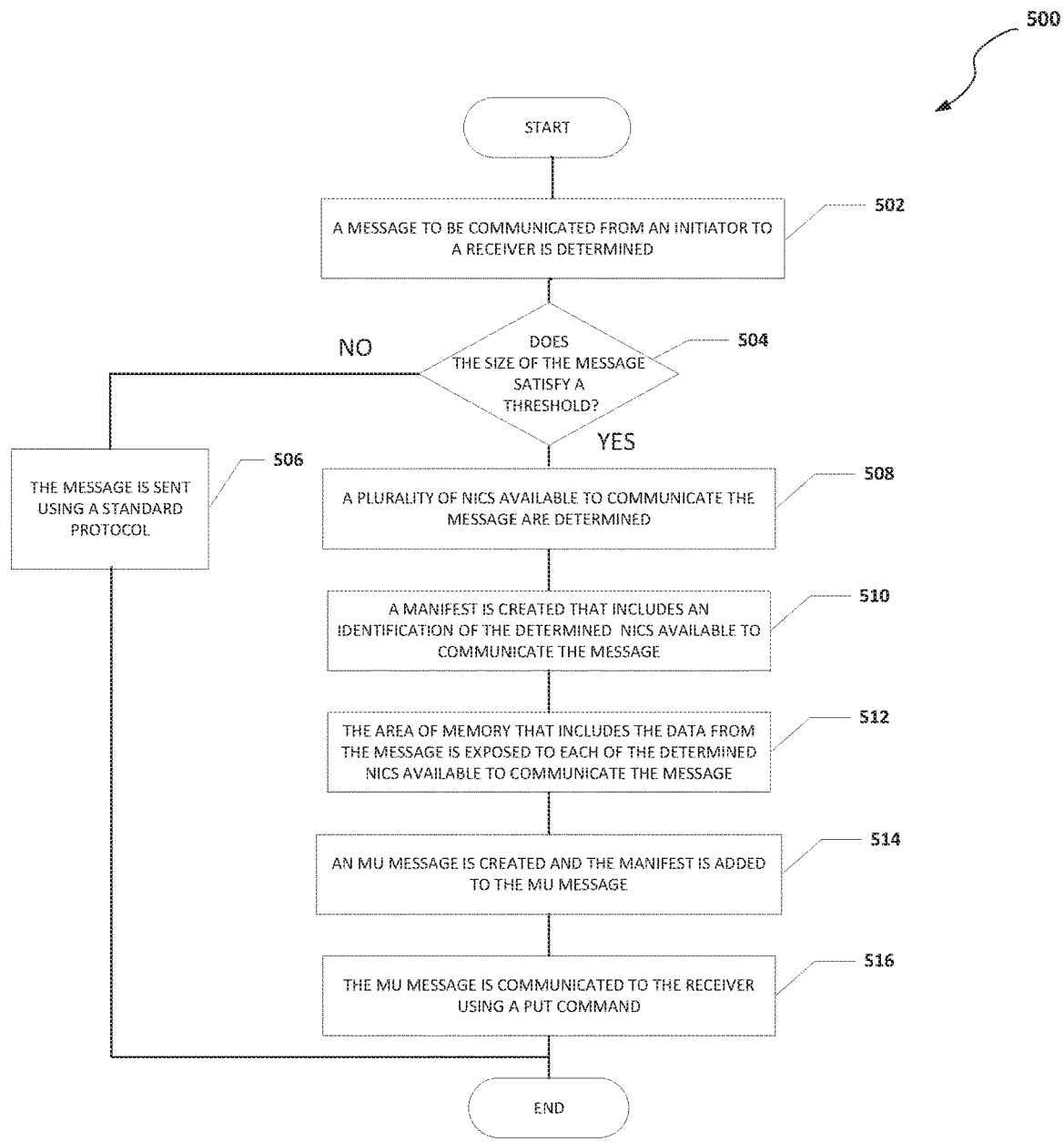
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with the communication of a large message using multiple NICs, in accordance with an embodiment. In an embodiment, one or more operations of flow 500 may be performed by communication engine 108. At 502, a message to be communicated from an initiator to a receiver is determined. At 504, the system determines if the size of the message satisfies a threshold. For example, the threshold may be an MTU threshold. If the size of message does not satisfy the threshold, then the message is sent using a standard protocol, as in 506. For example, if the message is small, the message can be sent using an MPI PUT command because the entire message fits in a single packet and is delivered to the receiver. If the message is large (e.g. larger than an MTU and MU is not enabled), then the message may be broken up into chunks and each chunk can be sent using a RTS/CTS mechanism to transfer each chunk.

If the size of the message does satisfy the threshold, then a plurality of NICs available to communicate the message are determined, as in 508. At 510, a manifest is created that includes an identification of the determined NICs available to communicate the message. At 512, the area of memory that includes the data for the message is exposed to each of the determined NICs available to communicate the message. At 514, an MU message is created and the manifest is added to the MU message. In an example, a message ID is also added to the MU message (e.g., the message ID is added to the envelope portion of an MU message). At 516, the MU message is communicated to the receiver using a PUT command.

Figure 6:
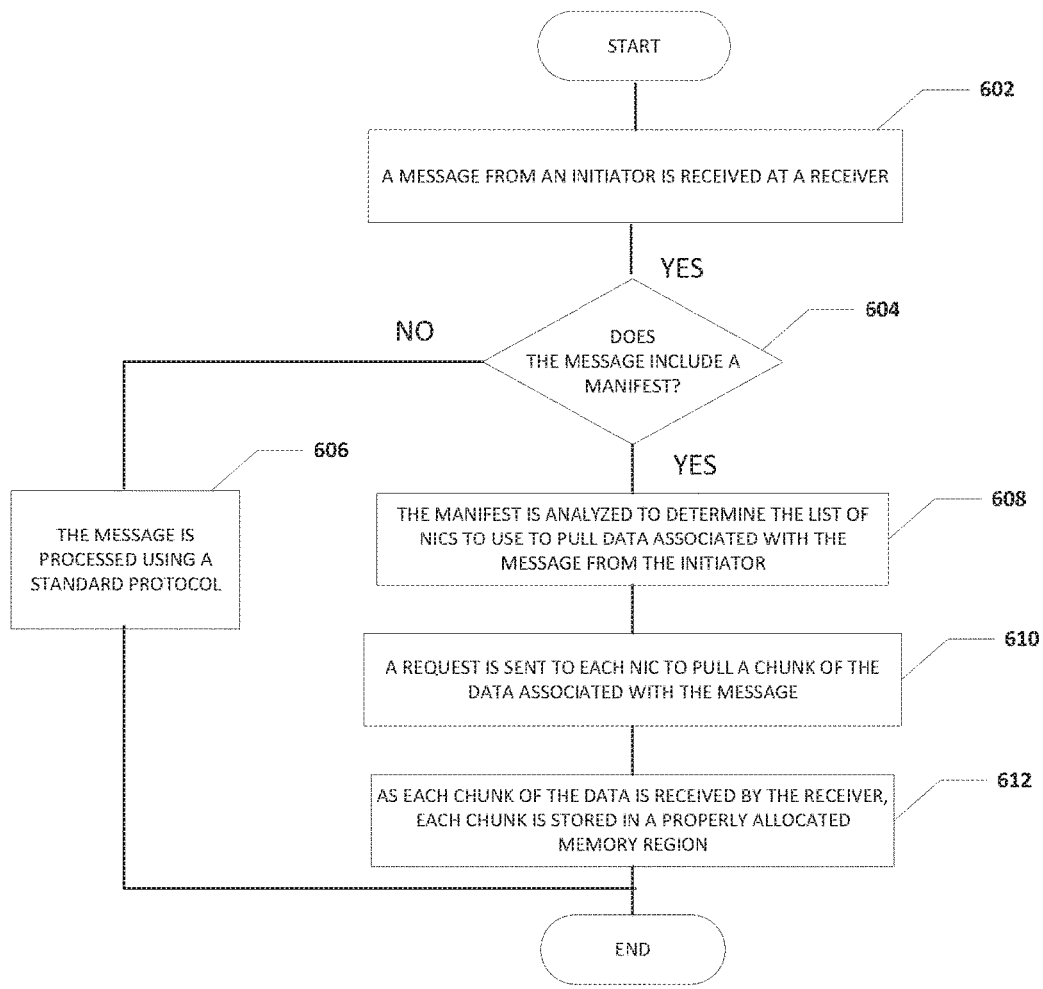
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with the communication of a large message using multiple NICs, in accordance with an embodiment. In an embodiment, one or more operations of flow 600 may be performed by communication engine 108. At 602, a message from an initiator is received at a receiver. At 604, the system determines if the message includes a manifest. If the message does not include a manifest, then the message is processed using a standard protocol, as in 606. For example, the message may be processed similar to an MPI PUT command, using a RTS/CTS mechanism, etc.

If the message does include a manifest, then the manifest is analyzed to determine the list of NICs to use to pull data associated with the message from the initiator, as in 608. At 610, a request is sent to each NIC to pull a chunk of the data associated with the message. For example, the message may be an MU message and the receiver may communicate several GETS to the initiator to obtain the data associated with the MU message from the initiator. In an example, only a portion of the NICs from the list of NICs are used to pull the message. At 614, as each chunk of the data is received by the receiver, each chunk is stored in a properly allocated memory region. For example, as each chunk of the data is received by the receiver, the receiver can determine the NIC that received the chunk, analyze the message ID, and determine the allocated memory region on the receiver that was allocated for the chunk. After all the chunks of the message have been received, a completed large message will have been communicated to the receiver using multiple NICs It is also important to note that the operations in the preceding flow diagrams (i.e., FIGS. 4-6) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor in a data center, cause the at least one processor to determine that a message to communicate to a receiver over a network included in the data center is larger than a maximum transmission unit (MTU), determine a plurality of initiator network interface controller (NICs) that are usable to communicate the message, create a manifest that includes an identifier of each of the plurality of initiator NICs, and communicate the manifest to the receiver.

In Example C2, the subject matter of Example C1 can optionally include where the manifest is communicated to the receiver using a multi-unit (MU) message and where the one or more instructions further cause the at least one processor to add an indicator to the MU message to indicate that the message includes the manifest.

In Example C3, the subject matter of any one of Examples C1-C2 can optionally include where the MU message is communicated using a message passing interface protocol PUT command.

In Example C4, the subject matter of any one of Examples C1-C3 can optionally include where the one or more instructions further cause the at least one processor to identify a region of memory that includes data to be included in the message, expose the region of memory that includes the data to the plurality of initiator NICs, where a message ID is used to help identify the exposed region of memory, and add the message ID to the MU message that includes the manifest.

In Example C5, the subject matter of any one of Examples C1-C4 can optionally include where the one or more instructions further cause the at least one processor to receive a message passing interface protocol GET command at each of the plurality of initiator NICs to pull the message from the plurality of initiator NICs, where the GET command includes the message ID.

In Example C6, the subject matter of any one of Examples C1-C5 can optionally include where the one or more instructions further cause the at least one processor to receive a message passing interface protocol GET command at a portion of the plurality of NICs to pull the message from the plurality of initiator NICs, where the GET command includes the message ID.

In Example C7, the subject matter of any one of Examples C1-C6 can optionally include where a message passing interface protocol is used to communicate the message.

In Example A1, a system in a data center can include a first network element, memory, a communication engine, and at least one processor. The communication engine is configured to cause the at least one processor to determine that a message to communicate to a receiver over a network included in the data center is larger than a maximum transmission unit (MTU), determine a plurality of initiator network interface controller (NICs) that are usable to communicate the message, create a manifest that includes an identifier of each of the plurality of initiator NICs, and communicate the manifest to the receiver.

In Example, A2, the subject matter of Example A1 can optionally include where the manifest is communicated to the receiver using a multi-unit (MU) message and where the communication engine is further configured to cause the at least one processor to add an indicator to the MU message to indicate that the message includes the manifest.

In Example A3, the subject matter of any one of Examples A1-A2 can optionally include where the MU message is communicated using a message passing interface protocol PUT command.

In Example A4, the subject matter of any one of Examples A1-A3 can optionally include where the communication engine is further configured to cause the at least one processor to identify a region of memory that includes data to be included in the message, expose the region of memory that includes the data to the plurality of initiator NICs, where a message ID is used to help identify the exposed region of memory, and add the message ID to the MU message that includes the manifest.

In Example A5, the subject matter of any one of Examples A1-A4 can optionally include where the communication engine is further configured to cause the at least one processor to receive a message passing interface protocol GET command at at least a portion of the plurality of initiator NICs to pull the message from the at least a portion of the plurality of initiator NICs, where the GET command includes the message ID.

Example M1 is a method including determining that a message to communicate to a receiver over a network included in a data center is larger than a maximum transmission unit (MTU), determining a plurality of initiator network interface controller (NICs) that are usable to communicate the message, creating a manifest that includes an identifier of each of the plurality of initiator NICs, and communicating the manifest to the receiver.

In Example M2, the subject matter of Example M1 can optionally include communicating the manifest to the receiver using a multi-unit (MU) message and adding an indicator to the MU message to indicate that the message includes the manifest.

In Example M3, the subject matter of any one of the Examples M1-M2 can optionally include where the MU message is communicated using a message passing interface protocol PUT command.

In Example M4, the subject matter of any one of the Examples M1-M3 can optionally include identifying a region of memory that includes data to be included in the message, exposing the region of memory that includes the data to the plurality of initiator NICs, where a message ID is used to help identify the exposed region of memory, and adding the message ID to the MU message that includes the manifest.

In Example M5, the subject matter of any one of the Examples M1-M4 can optionally include receiving a message passing interface protocol GET command at each of the plurality of initiator NICs to pull the message from the plurality of initiator NICs, where the GET command includes the message ID.

In Example M6, the subject matter of any one of Examples M1-M5 can optionally include receiving a message passing interface protocol GET command at a portion of the plurality of initiator NICs to pull the message from the plurality of initiator NICs, where the GET command includes the message ID.

Example S1 is a system in a data center for communication of a large message using multiple network interface controllers (NICs), the system can include memory, one or more processors, and a communication engine. The communication engine can be configured to determine that a message to communicate to a receiver over a network included in the data center is larger than a maximum transmission unit (MTU), determine a plurality of initiator network interface controller (NICs) that are usable to communicate the message, create a manifest that includes an identifier of each of the plurality of initiator NICs, and communicate the manifest to the receiver.

In Example S2, the subject matter of Example S1 can optionally include where the manifest is communicated to the receiver using a multi-unit (MU) message and where the communication engine is further configured to add an indicator to the MU message to indicate that the message includes the manifest.

In Example S3, the subject matter of any one of the Examples S1-S2 can optionally include where the MU message is communicated using a message passing interface protocol PUT command.

In Example S4, the subject matter of any one of the Examples S1-S3 can optionally include where the communication engine is further configured to identify a region of memory that includes data to be included in the message, expose the region of memory that includes the data to the plurality of initiator NICs, where a message ID is used to help identify the exposed region of memory, and add the message ID to the MU message that includes the manifest.

In Example S5, the subject matter of any one of the Examples S1-S4 can optionally include where the communication engine is further configured to receive a message passing interface protocol GET command at each of the plurality of initiator NICs to pull the message from the plurality of initiator NICs, where the GET command includes the message ID.

In Example S6, the subject matter of any one of the Examples S1-S5 can optionally include where the communication engine is further configured to receive a message passing interface protocol GET command at a portion of the plurality of initiator NICs to pull the message from the plurality of initiator NICs, where the GET command includes the message ID.

In Example S7, the subject matter of any one of the Examples S1-S6 can optionally include where a message passing interface protocol is used to communicate the message.

Example AA1 is an apparatus including means for determining that a message to communicate to a receiver over a network included in a data center is larger than a maximum transmission unit (MTU), means for determining a plurality of initiator network interface controller (NICs) to communicate the message, means for creating a manifest that includes an identifier of each of the plurality of initiator NICs, and means for communicating the manifest to a receiver.

In Example AA2, the subject matter of Example AA1 can optionally include the manifest is communicated to the receiver using a multi-unit (MU) message and means for adding an indicator to the MU message to indicate that the message includes the manifest.

In Example AA3, the subject matter of any one of Examples AA1-AA2 can optionally include where the MU message is communicated using a message passing interface protocol PUT command.

In Example AA4, the subject matter of any one of Examples AA1-AA3 can optionally include means for identifying a region of memory that includes data to be included in the message, means for exposing the region of memory that includes the data to the plurality of initiator NICs, where a message ID is used to help identify the exposed region of memory, and means for adding the message ID to the MU message that includes the manifest.

In Example AA5, the subject matter of any one of Examples AA1-AA4 can optionally include means for receiving a message passing interface protocol GET command at each of the plurality of initiator NICs to pull the message from the plurality of initiator NICs, where the GET command includes the message ID.

In Example AA6, the subject matter of any one of Examples AA1-AA5 can optionally include means for receiving a message passing interface protocol GET command at a portion of the plurality of initiator NICs to pull the message from the plurality of initiator NICs, where the GET command includes the message ID.

In Example AA7, the subject matter of any one of Examples AA1-AA6 can optionally include where a message passing interface protocol is used to communicate the message.

Example X1 is a machine-readable storage medium including machine-readable instructions to implement a method or realize an apparatus as in any one of the Examples A1-A4, AA1-AA7, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor in a data center, causes the at least one processor to:
   determine that a message to communicate to a receiver over a network included in the data center is larger than a maximum transmission unit (MTU);
   determine a plurality of initiator network interface controllers (NICs) that are to be used to communicate the message;
   create a manifest that includes an identifier of each of the plurality of initiator NICs to be used to communicate the message; and
   communicate the manifest to the receiver using a multi-unit (MU) message.

2. The at least one machine readable medium of claim 1, wherein the one or more instructions further cause the at least one processor to:
   add an indicator to the MU message to indicate that the message includes the manifest.

3. The at least one machine readable medium of claim 2, wherein the MU message is communicated using a message passing interface protocol PUT command.

4. The at least one machine readable medium of claim 2, wherein the one or more instructions further cause the at least one processor to:
   identify a region of memory that includes data to be included in the message;
   expose the region of memory that includes the data to the plurality of initiator NICs, wherein a message ID is used to help identify the exposed region of memory; and
   add the message ID to the MU message that includes the manifest.

5. The at least one machine readable medium of claim 4, wherein the one or more instructions further cause the at least one processor to:
   receive a message passing interface protocol GET command at each of the plurality of initiator NICs to pull the message from the plurality of initiator NICs, wherein the GET command includes the message ID.

6. The at least one machine readable medium of claim 4, wherein the one or more instructions further cause the at least one processor to:
   receive a message passing interface protocol GET command at a portion of the plurality of initiator NICs to pull the message from the plurality of initiator NICs, wherein the GET command includes the message ID.

7. A system in a data center comprising:
   a first network element;
   memory;
   a communication engine; and
   at least one processor, wherein the communication engine is configured to cause the at least one processor to:
   determine that a message to communicate to a receiver over a network included in the data center is larger than a maximum transmission unit (MTU);
   determine a plurality of initiator network interface controllers (NICs) that are to be used to communicate the message;
   create a manifest that includes an identifier of each of the plurality of initiator NICs to be used to communicate the message; and
   communicate the manifest to the receiver using a multi-unit (MU) message.

8. The system of claim 7, wherein the communication engine is further configured to cause the at least one processor to:
   add an indicator to the MU message to indicate that the message includes the manifest.

9. The system of claim 8, wherein the MU message is communicated using a message passing interface protocol PUT command.

10. The system of claim 8, wherein the communication engine is further configured to cause the at least one processor to:
    identify a region of memory that includes data to be included in the message;
    expose the region of memory that includes the data to the plurality of initiator NICs, wherein a message ID is used to help identify the exposed region of memory; and
    add the message ID to the MU message that includes the manifest.

11. The system of claim 10, wherein the communication engine is further configured to cause the at least one processor to:
    receive a message passing interface protocol GET command at at least a portion of the plurality of initiator NICs to pull the message from the at least a portion of the plurality of initiator NICs, wherein the GET command includes the message ID.

12. A method comprising:
- determining that a message to communicate to a receiver over a network included in a data center is larger than a maximum transmission unit (MTU);
- determining a plurality of initiator network interface controllers (NICs) that are to be used to communicate the message;
- creating a manifest that includes an identifier of each of the plurality of initiator NICs to be used to communicate the message; and
- communicating the manifest to the receiver using a multi-unit (MU) message.

13. The method of claim 12, further comprising:
- adding an indicator to the MU message to indicate that the message includes the manifest.

14. The method of claim 13, wherein the MU message is communicated using a message passing interface protocol PUT command.

15. The method of claim 13, further comprising:
- identifying a region of memory that includes data to be included in the message;
- exposing the region of memory that includes the data to the plurality of initiator NICs, wherein a message ID is used to help identify the exposed region of memory; and
- adding the message ID to the MU message that includes the manifest.

16. The method of claim 15, further comprising:
- receiving a message passing interface protocol GET command at each of the plurality of initiator NICs to pull the message from the plurality of initiator NICs, wherein the GET command includes the message ID.

17. The method of claim 15, further comprising:
- receiving a message passing interface protocol GET command at a portion of the plurality of initiator NICs to pull the message from the plurality of initiator NICs, wherein the GET command includes the message ID.

18. A system in a data center for communication of a large message using multiple network interface controllers (NICs), the system comprising:
- memory;
- one or more processors; and
- a communication engine, wherein the communication engine is configured to:
  - determine that a message to communicate to a receiver over a network included in the data center is larger than a maximum transmission unit (MTU);
  - determine a plurality of initiator network interface controllers (NICs) that are to be used to communicate the message;
  - create a manifest that includes an identifier of each of the plurality of initiator NICs to be used to communicate the message; and
  - communicate the manifest to the receiver using a multi-unit (MU) message.

19. The system of claim 18, wherein the communication engine is further configured to:
- add an indicator to the MU message to indicate that the message includes the manifest.

20. The system of claim 19, wherein the MU message is communicated using a message passing interface protocol PUT command.

21. The system of claim 19, wherein the communication engine is further configured to:
- identify a region of memory that includes data to be included in the message;
- expose the region of memory that includes the data to the plurality of initiator NICs, wherein a message ID is used to help identify the exposed region of memory; and
- add the message ID to the MU message that includes the manifest.

22. The system of claim 21, wherein the communication engine is further configured to:
- receive a message passing interface protocol GET command at each of the plurality of initiator NICs to pull the message from the plurality of initiator NICs, wherein the GET command includes the message ID.

23. The system of claim 21, wherein the communication engine is further configured to:
- receive a message passing interface protocol GET command at a portion of the plurality of initiator NICs to pull the message from the plurality of initiator NICs, wherein the GET command includes the message ID.

* * * * *